(12) United States Patent
Yamamoto

(10) Patent No.: US 9,296,974 B2
(45) Date of Patent: Mar. 29, 2016

(54) EXTREME PRESSURE AGENT FOR LUBRICANT OIL AND LUBRICANT OIL COMPOSITION CONTAINING SAME

(75) Inventor: Kenji Yamamoto, Tokyo (JP)

(73) Assignee: ADEKA CORPORATION, Tokyo (JP)

( * ) Notice: Subject to any disclaimer, the term of this patent is extended or adjusted under 35 U.S.C. 154(b) by 57 days.

(21) Appl. No.: 13/817,192

(22) PCT Filed: Aug. 15, 2011

(86) PCT No.: PCT/JP2011/068529
§ 371 (c)(1),
(2), (4) Date: Feb. 15, 2013

(87) PCT Pub. No.: WO2012/023544
PCT Pub. Date: Feb. 23, 2012

(65) Prior Publication Data
US 2013/0150274 A1 Jun. 13, 2013

(30) Foreign Application Priority Data
Aug. 17, 2010 (JP) .................................. 2010-182256

(51) Int. Cl.
| C07C 69/34 | (2006.01) |
| C10M 145/16 | (2006.01) |
| C10M 145/14 | (2006.01) |
| C08F 220/18 | (2006.01) |

(52) U.S. Cl.
CPC ............ *C10M 145/14* (2013.01); *C08F 220/18* (2013.01); *C10M 2203/1006* (2013.01); *C10M 2207/289* (2013.01); *C10M 2209/084* (2013.01); *C10M 2211/08* (2013.01); *C10M 2223/041* (2013.01); *C10N 2220/021* (2013.01); *C10N 2220/022* (2013.01); *C10N 2230/06* (2013.01); *C10N 2230/70* (2013.01); *C10N 2240/02* (2013.01); *C10N 2240/04* (2013.01); *C10N 2240/08* (2013.01); *C10N 2240/10* (2013.01); *C10N 2240/14* (2013.01); *C10N 2240/22* (2013.01); *C10N 2240/30* (2013.01); *C10N 2240/40* (2013.01); *C10N 2250/10* (2013.01)

(58) Field of Classification Search
CPC ....................... C10M 145/14; C10M 2209/084
USPC .................................................. 508/465, 468
See application file for complete search history.

(56) References Cited

U.S. PATENT DOCUMENTS

| 2004/0077509 A1* | 4/2004 | Yuki et al. ................ 508/469 |
| 2006/0240999 A1* | 10/2006 | Placek et al. .............. 508/469 |
| 2007/0219101 A1* | 9/2007 | Scherer et al. ............ 508/469 |

FOREIGN PATENT DOCUMENTS

| CN | 101535455 | 9/2009 |
| JP | 2004-186429 | 7/2004 |
| JP | 2008-133440 | 6/2008 |
| WO | 98/17723 | 4/1998 |

OTHER PUBLICATIONS

Supplementary European Search Report issued Jan. 7, 2014 in European Application No. 11 81 8185.
Office Action issued Nov. 15, 2013 in Chinese Application No. 201180039762.7.

* cited by examiner

*Primary Examiner* — Prem C Singh
*Assistant Examiner* — Francis C Campanell
(74) *Attorney, Agent, or Firm* — Wenderoth, Lind & Ponack, L.L.P.

(57) ABSTRACT

The purpose of the present invention is to provide an extreme pressure agent which does not contain any metal element or the like and is highly safe but which exhibits performance equivalent to those of conventional extreme pressure agents each containing a metal element or the like when used in lubrication purposes.
This extreme pressure agent comprises a copolymer (A) which comprises an alkyl acrylate (a) represented by general formula (1) and a hydroxyalkyl acrylate (b) represented by general formula (2) as the essential constituent monomers, and is characterized in that the reaction ratio of the component (a) to the component (b) (i.e., (a)/(b)) is 50/50 to 80/20 (by mole) and the copolymer (A) has a weight average molecular weight of 40,000-150,000. (In formula (1), R1 represents an alkyl group having 10-18 carbon atoms.) (In formula (2), R2 represents an alkylene group having 2-4 carbon atoms.)

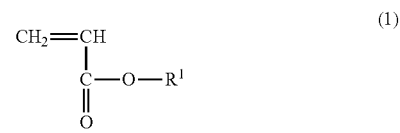

(in the formula, $R^1$ represents an alkyl group having 10 to 18 carbon atoms)

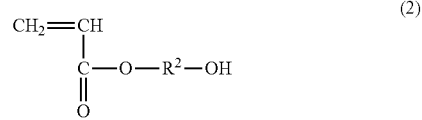

(in the formula, $R^2$ represents an alkylene group having 2 to 4 carbon atoms).

4 Claims, No Drawings

EXTREME PRESSURE AGENT FOR LUBRICANT OIL AND LUBRICANT OIL COMPOSITION CONTAINING SAME

TECHNICAL FIELD

The present invention relates to a novel extreme pressure agent, more specifically to a novel extreme pressure agent which does not contain any metal elements or elements such as phosphorus and sulfur but which exhibits performance equivalent to that of conventional extreme pressure agents which contain a metal element or an element such as phosphorus and sulfur.

BACKGROUND ART

Lubricants are used for various purposes such as use in metalworking fluid, engine oil, driving system oils, and working oil, but in recent years, with increased performance and size of machines the viscosity of lubricant oil has been reduced for fuel-saving purposes. The impact of this is that there is an increase in cases where the pressure applied to contact surfaces that require lubrication is grater than here before and there is an increase in problems of wear occurring in the contact surface. In order to prevent such wear, extreme pressure agents are generally used (for example, see Patent publications 1-3).

Patent publication 1 describes sulfides, sulfoxides, sulfones, thiophosphinates, thiocarbonates, dithiocarbides, alkylthiocarbamoyls, fat and oil, sulfurated fat and oil, sulfurated olefins, phosphates, phosphites, phosphoric ester amine salts, phosphorous ester amine salts, chlorinated hydrocarbons, chlorinated fat and oil, zinc dithiophosphates, thiocarbamates, and the like as extreme pressure agents for lubricant oils.

Patent publication 2 describes lead naphthenate, sulfurated fatty acid esters, sulfurated palm oil, sulfurated terpene, dibenzyl disulfide, chlorinated paraffin, chloronaphtha xanthate, tricresyl phosphate, tributyl phosphate, tricresyl phosphite, n-butyldi-n-octyl phosphinate, di-n-butyl dihexyl phosphonate, di-n-butyl phenyl phosphonate, dibutyl phosphoramidate, amine dibutyl phosphate and the like as extreme pressure agents for lubricant oils.

Patent publication 3 describes sulfurated fat and oil, olefin polysulfides, dibenzyl sulfide, monooctyl phosphate, tributyl phosphate, triphenyl phosphite, tributyl phosphite, thiophosphate, thiophosphoric acid metal salts, thiocarbamic acid metal salts, acidic phosphoric acid ester metal salts, and the like as extreme pressure agents for lubricant oils.

However, most of these known extreme pressure agents contain elements such as sulfur, phosphorus, lead, zinc, and chlorine. Although these elements play an important role as extreme pressure agents, on the other hand there are cases where they may lead to corrosion on lubricated surfaces, may adversely affect human health or have an adverse effect on the environment when disposing of lubricant oils. Recently, due to increased awareness of environmental issues and safety regarding humans, use of compounds comprising any of these elements is avoided and there is a strong desire to use compounds consisting of three elements, i.e., carbon, hydrogen, and oxygen are used to achieve the effect. On the other hand, it has been known that fat and oil (see Patent publication 1) and compounds without metal elements or the like such as fatty acid esters have performance as extreme pressure agents, but the level of performance of these compounds as extreme pressure agents is low, and thus they cannot be used under severe conditions. Therefore, a highly safe extreme pressure agent which does not contain any of the above metal elements or the like but which exhibits performance equivalent to that of conventional extreme pressure agents containing a metal element or the like, has been desired.

CONVENTIONAL ART REFERENCES

Patent Publications

Patent publication 1: Japanese Patent Laid-Open No. 1-287196
Patent publication 2: Japanese Patent Laid-Open No. 2002-012881
Patent publication 3: Japanese Patent Laid-Open No. 2005-325241

SUMMARY OF THE INVENTION

Problems to be Solved by the Invention

Accordingly, the problem to be solved by the present invention is to provide a highly safe extreme pressure agent which does not contain any metal elements or the like but which exhibits performance equivalent to that of conventional extreme pressure agents containing a metal element or the like, but for use in lubrication.

Means for Solving the Problems

The inventors of this application keenly studied and found additives which do not contain any metal elements or the like, but which exhibit a high level of extreme pressure performance to complete the present invention. Namely, the present invention relates to an extreme pressure agent for lubricant oils comprising a copolymer (A) comprising an alkyl acrylate (a) represented by the general formula (1) below and a hydroxyalkyl acrylate (b) represented by the general formula (b) below as essential constituent monomers, wherein the reaction ratio of (a) to (b) is 50/50 to 80/20 (at a molar ratio) and the weight average molecular weight of the copolymer (A) is 40,000 to 150,000.

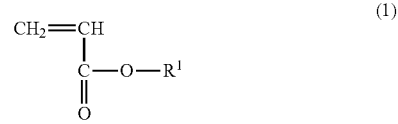

(In the formula, $R^1$ represents an alkyl group having 10 to 18 carbon atoms.)

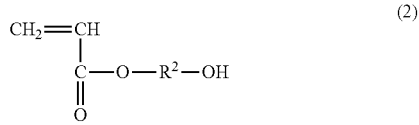

(In the formula, $R^2$ represents an alkylene group having 2 to 4 carbon atoms.)

Effect of the Invention

The effect of the present invention is to provide a highly safe extreme pressure agent which does not contain any metal elements or the like, more specifically, an extreme pressure agent consisting of three elements, i.e., carbon, hydrogen, and oxygen, but which exhibits performance equivalent to that of conventional extreme pressure agents containing a metal element or the like.

MODE FOR CARRYING OUT THE INVENTION

The alkyl acrylate (a) used in the present invention is an alkyl acrylate having an alkyl group with 10 to 18 carbon atoms and is represented by the general formula (1) below.

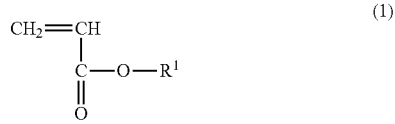

(In the formula, $R^1$ represents an alkyl group having 10 to 18 carbon atoms.)

$R^1$ in the general formula (1) above includes, for example, linear alkyl groups such as a decyl group, undecyl group, dodecyl group, tridecyl group, tetradecyl group, pentadecyl group, hexadecyl group, heptadecyl group, and octadecyl group; branched alkyl groups such as a branched decyl group, branched undecyl group, branched dodecyl group, branched tridecyl group, branched tetradecyl group, branched pentadecyl group, branched hexadecyl group, branched heptadecyl group, and branched octadecyl group, and the like. Among them, in terms of the balance between the solubility in a lubricant base oil and extreme pressure performance, an alkyl group having 10 to 16 carbon atoms is preferable, an alkyl group having 10 to 14 carbon atoms is more preferable, and a linear alkyl group having 10 to 14 carbon atoms is even more preferable.

The hydroxyalkyl acrylate (b) used in the present invention is a hydroxyalkylene acrylate having an alkyl group with 2 to 4 carbon atoms and is represented by the general formula (2) below.

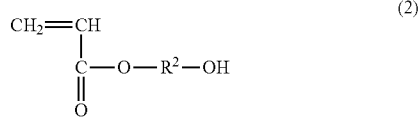

(In the formula, $R^2$ represents an alkylene group having 2 to 4 carbon atoms.)

$R^2$ in the general formula (2) above includes, for example, an ethylene group, propylene group, butylene group, methylethylene group, methylpropylene group, dimethylethylene group, and the like. Among them, considering economic production, an alkylene group having 2 to 3 carbon atoms is preferable and an ethylene group is more preferable.

Copolymer (A) can be obtained by copolymerizing the monomers (a) and (b) above. The form of the copolymer (A) is not particularly limited. It may be prepared either by block copolymerization, random copolymerization, or block/random copolymerization. Among them, considering the ease in polymerization reaction, random copolymerization is preferably applied. The reaction ratio of the monomer (a) to (b), i.e., (a)/(b) must range from 50/50 to 80/20 (molar ratio), preferably 50/50 to 70/30 (molar ratio), more preferably 55/45 to 65/35 (molar ratio) because it significantly affects the extreme pressure performance of the obtained copolymer and solubility thereof in a base oil. If the ratio of the monomer (a) is larger than (a)/(b)=80/20 (molar ratio), excellent extreme pressure performance cannot be obtained. If the ratio of the monomer (b) is larger than (a)/(b)=50/50 (molar ratio), the solubility in the base oil is decreased and thereby problems such as precipitation and turbidity occur.

The copolymer (A) obtained by copolymerizing the monomers (a) and (b) must have a weight average molecular weight of 40,000 to 150,000. Considering the balance between the extreme pressure performance and the solubility in the base oil, the weight average molecular weight is preferably 50,000 to 100,000. If the weight average molecular weight is less than 40,000, excellent extreme pressure performance cannot be obtained. If it is more than 150,000, the solubility in the base oil is decreased and thereby problems such as precipitation and turbidity occur and excellent extreme pressure performance cannot be obtained. Further, the weight average molecular weight is determined by GPC (gel permeation chromatography) to obtain the value thereof in terms of styrene.

The method for synthesizing the extreme pressure agent for lubricant oils of the present invention is not particularly limited, and any conventional method may be applied. Examples of the method include emulsion polymerization, suspension polymerization, solution polymerization, and the like. However, as the extreme pressure agent for lubricant oils of the present invention is used in such a manner that it is added to a base oil such as mineral oil and synthetic oil, solution polymerization using an organic solvent that can be dissolved in the base oil as a solvent is more preferable than polymerization methods using water as a solvent such as emulsion polymerization and suspension polymerization. If synthesized by emulsion polymerization and suspension polymerization, a step of removing water after the synthesis is necessary, but in the case of solution polymerization, without the step of removing the solvent, the product of the present invention containing a solvent can be added directly to the base oil. Further, in the case of solution polymerization, a solvent can be further added to the system after polymerization to prepare a final product or some or all of the solvent may be removed to prepare a final product.

An example of the specific method for solution polymerization comprises charging the monomers (a) and (b) with a solvent in a reactor such that the total of the monomers account for 5 to 80 wt % and then heating the mixture to about 80 to 120° C., adding an initiator in an amount of 0.1 to 10 mol % with respect to the total weight of the monomers, in undivided or divided portions, and reacting the mixture for 1 to 20 hours with stirring.

Examples of the solvent that may be used include alcohols such as methanol, ethanol, propanol, and butanol; hydrocarbons such as benzene, toluene, xylene, and hexane; esters such as ethyl acetate, butyl acetate, and isobutyl acetate; ketones such as acetone, methyl ethyl ketone, and methyl isobutyl ketone; ethers such as methoxybutanol, ethoxybutanol, ethylene glycol monomethyl ether, ethylene glycol monobutyl ether, propylene glycol monobutyl ether, and dioxane; paraffin-based mineral oil, naphthene-based mineral oil, or mineral oils obtained after purification thereof by hydrogenation purification, solvent removal, solvent extraction, solvent dewaxing, hydrogenated dewaxing, catalytic dewaxing, hydrogenolysis, alkaline distillation, washing with sulfuric acid, treatment with white clay or the like; synthetic oils such as poly-α-olefin, ethylene-α-olefin copolymers, polybutene, alkyl benzene, alkyl naphthalene, polyphenyl ether, alkyl substituted diphenyl ether, polyol esters, dibasic esters, hindered esters, monoesters, GTL (Gas to Liquids) and mixtures thereof.

For example, azo-based initiators such as 2,2'-azobis(2-methylpropyonitrile), 2,2'-azobis(2-amidinopropane)dihydrochloride, 2,2'-azobis-(N,N-dimethyleneisobutylamidine) dihydrochloride, 1,1'-azobis(cyclohexyl-1-carbonitrile); organic peroxides such as hydrogen peroxide, benzoyl peroxide, t-butyl hydroperoxide, cumene hydroperoxide, methyl ethyl ketone peroxide, and perbenzoic acid; persulfates such as sodium persulfate, potassium persulfate, and ammonium persulfate; redox initiators such as hydrogen peroxide-$Fe^{2+}$; and other conventional radical initiators may be used as the initiators. Further, the extreme pressure agent for lubricant oils of the present invention should have a specific molecular weight, but the molecular weight at the time of synthesis may be controlled by a conventional means such as reaction temperature, amount of initiator, monomer charging method, the kind of solvent, and use of a chain transfer agent.

Monomers other than the monomers (a) and (b) may be copolymerized to prepare the copolymer (A) as long as the effect of the present invention can be exhibited. The polymerization method of other monomers is not particularly specified. Other monomers may be copolymerized after the polymerization of the monomers (a) and (b) or other monomers together with the monomers (a) and (b) may be copolymerized. Any monomers having a double bond may be used as said other monomers. Examples thereof include aromatic vinyl monomers such as styrene, vinyl toluene, 2,4-dimethylstyrene, 4-ethylstyrene, and 2-vinylnaphtharene; aliphatic vinyl monomers such as vinyl acetate, vinyl propionate, vinyl octanoate, methyl vinyl ether, ethyl vinyl ether, and 2-ethylhexyl vinyl ether; halogenated vinyl monomers such as vinyl chloride, vinyl bromide, vinylidene chloride, ally chloride, and dichlorostyrene; acrylates such as methyl acrylate, ethyl acrylate, propyl acrylate, butyl acrylate, pentyl acrylate, hexyl acrylate, heptyl acrylate, octyl acrylate, and nonyl acrylate; amino group-containing monomers such as allyl amine, aminoethyl acrylate, aminopropyl acrylate, aminobutyl acrylate, methylaminoethyl acrylate, 2-diphenylamine acrylamide, diemthylaminomethyl acrylate, dimethylaminomethyl acrylamide, N,N-dimethylaminostyrene, 4-vinylstyrene, and N-vinylpyrrolidone, and the like. The methacryl group has a similar structure to that of the acrylate group, but if a monomer containing a methacryl group is used, the solubility in the base oil may be reduced. In addition, if the content of these other monomers is large in the obtained copolymer, the extreme pressure performance may not be exhibited and the solubility in the base oil may be insufficient. Therefore, the content of these other monomers in the obtained copolymer is preferably 30 wt % or less, more preferably 20 wt % or less, more preferably 10 wt % or less, and most preferably not substantially contained. The monomer (a) and the monomer (b) have an acryl group, but if this group is a methacryl group, the effect of the present invention cannot be obtained. For example, a copolymer produced using an alkyl methacrylate or hydroxyalkylene methacrylate does not exhibit a high level of extreme pressure performance.

The lubricant oil composition of the present invention is a product prepared by adding the extreme pressure agent for lubricant oils of the present invention to the base oil. Examples of the base oil that may be used include paraffin-based mineral oils, naphthene-based mineral oils or mineral oils such as purified mineral oil subjected to hydrogenation purification, solvent removal, solvent extraction, solvent dewaxing, hydrogenated dewaxing, catalytic dewaxing, hydrogenolysis, alkaline distillation, washing with sulfuric acid, treatment with white clay or the like; synthetic oils such as poly-α-olefin, ethylene-α-olefin copolymers, polybutene, alkyl benzene, alkyl naphthalene, polyphenyl ether, alkyl substituted diphenyl ether, polyol esters, dibasic esters, hindered esters, monoesters, GTL (Gas to Liquids) and mixtures of the mineral oil with the synthetic oil.

The amount of the extreme pressure agent for lubricant oils of the present invention added in the lubricant oil composition of the present invention is not particularly limited, but it is preferably added in an amount of 0.1 to 50 wt %, more preferably 1 to 30 wt %, and most preferably 3 to 20 wt % with respect to the total amount of the lubricant oil composition. The extreme pressure performance may not be obtained using less than 0.1 wt % thereof. Using more than 50 wt % thereof, the composition may not be completely dissolved in the base oil or a level of effect corresponding to the added amount may not be obtained.

Further, publicly known additives for lubricant oils may be added to the lubricant oil composition of the present invention. Antioxidant agents, friction reducers, oiliness improvers, cleansers, dispersants, viscosity index improvers, pour-point depressants, antirust agents, anticorrosive agents, and antifoaming agents may be added in a range which does not impair the effect of the present invention.

Examples of the antioxidant agents include phenolic antioxidants such as 2,6-di-tertiary butyl phenol (hereinafter, tertiary butyl is abbreviated as t-butyl), 2,6-di-t-butyl-p-cresol, 2,6-di-t-butyl-4-methylphenol, 2,6-di-t-butyl-4-ethylphenol, 2,4-dimethyl-6-t-butylphenol, 4,4'-methylenebis(2,6-di-t-butylphenol), 4,4'-bis(2,6-di-t-butylphenol), 4,4'-bis(2-methyl-6-t-butylphenol), 2,2'-methylenebis(4-methyl-6-t-butylphenol), 2,2'-methylenebis(4-ethyl-6-t-butylphenol), 4,4'-butylidenbis(3-methyl-6-t-butylphenol), 4,4'-isopropylenebis(2,6-di-t-butylphenol), 2,2'-methylenebis(4-methyl-6-cyclohexylphenol), 2,2'-methylenebis(4-methyl-6-nonylphenol), 2,2'-isobutylidenbis(4,6-dimethylphenol), 2,6-bis(2'-hydroxy-3'-t-butyl-5'-methylbenzyl)-4-methylphenol, 3-t-butyl-4-hydroxyanisole, 2-t-butyl-4-hydroxyanisole, octyl 3-(4-hydroxy-3,5-di-t-butylphenyl)propionate, stearyl 3-(4-hydroxy-3,5-di-t-butylphenyl)propionate, oleyl 3-(4-hydroxy-3,5-di-t-butylphenyl)propionate, dodecyl 3-(4-hydroxy-3,5-di-t-butylphenyl)propionate, decyl 3-(4-hydroxy-3,5-di-t-butylphenyl)propionate, octyl 3-(4-hydroxy-3,5-di-t-butylphenyl)propionate, tetrakis{3-(4-hydroxy-3,5-di-t-butylphenyl)propionyloxymethyl}methane, 3-(4-hydroxy-3,5-di-t-butylphenyl) propionic acid glycerin monoester, an ester of 3-(4-hydroxy-3,5-di-t-butylphenyl) propionic acid with glycerin monooleyl ether, 3-(4-hydroxy-3,5-di-t-butylphenyl)propionic acid butylene glycol diester, 3-(4-hydroxy-3,5-di-t-butylphenyl)propionic acid thiodiglycol diester, 4,4'-thiobis(3-methyl-6-t-butylphenol), 4,4'-thiobis(2-methyl-6-t-butylphenol), 2,2'-thiobis(4-methyl-6-t-butylphenol), 2,6-di-t-butyl-α-dimethylamino-p-cresol, 2,6-di-t-butyl-4-(N,N'-dimethylaminomethylphenol), bis(3,5-di-t-butyl-4-hydroxybenzyl)sulfide, tris{(3,5-di-t-butyl-4-hydroxyphenyl)propionyl-oxyethyl}isocyanurate, tris(3,5-di-t-butyl-4-hydroxyphenyl)isocyanurate, 1,3,5-tris(3,5-di-t-butyl-4-hydroxybenzyl)isocyanurate, bis{2-methyl-4-(3-n-alkylthiopropionyloxy)-5-t-butylphenyl}sulfide, 1,3,5-tris (4-t-butyl-3-hydroxy-2,6-dimethylbenzyl)isocyanurate, tetraphthaloyl-di(2,6-dimethyl-4-t-butyl-3-hydroxybenzyl-sulfide), 6-(4-hydroxy-3,5-di-t-butylanilino)-2,4-bis(octylthio)-1,3,5-triazine, 2,2-thio-{diethyl-bis-3-(3,5-di-t-butyl-4-hydroxyphenyl)}propionate, N,N'-hexamethylenebis (3,5-di-t-butyl-4-hydroxy-hydrocynamide), 3,5-di-t-butyl-4-hydroxy-benzyl-phosphoric acid diester, bis(3-methyl-4-hydroxy-5-t-butylbenzyl)sulfide, 3,9-bis[1,1-dimethyl-2-{β-

(3-t-butyl-4-hydroxy-5-methylphenyl)propionyloxy}ethyl] 2,4,8,10-tetraoxaspiro[5,5]undecane, 1,1,3-tris(2-methyl-4-hydroxy-5-t-butylphenyl)butane, 1,3,5-trimethyl-2,4,6-tris (3,5-di-t-butyl-4-hydroxybenzyl)benzene, bis(3,3'-bis-(4'-hydroxy-3'-t-butylphenyl)butyric acid)glycol ester; naphthylamine antioxidants such as 1-naphthylamine, phenyl-1-naphthylamine, p-octylphenyl-1-naphthylamine, p-nonylphenyl-1-naphthylamine, p-dodecylphenyl-1-naphthylamine, and phenyl-2-naphthylamine; phenylenediamine antioxidants such as N,N'-diisopropyl-p-phenylenediamine, N,N'-diisobutyl-p-phenylenediamine, N,N'-diphenyl-p-phenylenediamine, N,N'-di-β-naphthyl-p-phenylenediamine, N-phenyl-N'-isopropyl-p-phenylenediamine, N-cyclohexyl-N'-phenyl-p-phenylenediamine, N-1,3-dimethylbutyl-N'-phenyl-p-phenylenediamine, dioctyl-p-phenylenediamine, phenylhexyl-p-phenylenediamine, and phenyloctyl-p-phenylenediamine; diphenylamine antioxidants such as dipyridylamine, diphenylamine, p,p'-di-n-butyldiphenylamine, p,p'-di-t-butyldiphenylamine, p,p'-di-t-pentyldiphenylamine, p,p'-dioctyldiphenylamine, p,p'-dinonyldiphenylamine, p,p'-didecyldiphenylamine, p,p'-didodecyldiphenylamine, p,p'-distryldiphenylamine, p,p'-dimethoxydiphenylamine, 4,4'-bis(4-α,α-dimethylbenzoyl)diphenylamine, p-isopropoxydiphenylamine, and dipyridylamine; phenothiazine antioxidants such as phenothiazine, N-methylphenothiazine, N-ethylphenothiazine, 3,7-dioctylphenothiazine, phenothiazine carboxylate, and phenoselenazine; and zinc dithiophosphate. The amount of these antioxidants formulated is preferably 0.01 to 5 wt %, more preferably 0.05 to 4 wt %.

Examples of the friction reducers include organic molybdenum compounds such as sulfurated oxymolybdenum dithiocarbamate and sulfrated oxymolybdenum dithiophosphate. The amount of these friction reducers formulated is preferably 30 to 2,000 wtppm, more preferably 50 to 1,000 wtppm in terms of molybdenum content with respect to the base oil.

Examples of the oiliness improvers include higher alcohols such as oleyl alcohol and stearyl alcohol; fatty acids such as oleic acid and stearic acid; esters such as oleyl glyceride, steryl glyceride, and lauryl glyceride; amides such as laurylamide, oleylamide, and stearylamide; amines such as laurylamine, oleylamine, and stearylamine; ethers such as lauryl glycerin ether and oleyl glycerin ether. The amount of these oiliness improvers formulated is preferably 0.1 to 5 wt %, more preferably 0.2 to 3 wt % with respect to the base oil.

Examples of the cleansers include sulfonates, phenates, salicylates, and phosphates of calcium, magnesium, barium, and the like and overbased salts thereof. Among them, overbased salts are preferable, and overbased salts having a TBN (total basic number) of 30 to 500 mgKOH/g are more preferable. Further, salicylate-based cleansers free of phosphorus and sulfur atoms are preferable. The amount of these cleansers formulated is preferably 0.5 to 10 wt %, more preferably 1 to 8 wt % with respect to the base oil.

Examples of the dispersants include succinimides succinates or benzylamines to which an alkyl group or alkenyl group having a weight average molecular weight of about 500 to 3,000 is added, or boron modified products thereof. The amount of these dispersants formulated is preferably 0.5 to 10 wt %, more preferably 1 to 8 wt % with respect to the base oil.

Examples of the viscosity index improvers include poly (C1-18) alkyl(meth)acrylate, (C1-18) alkyl acrylate/(C1-18) alkyl(meth)acrylate copolymers, diethylaminoethyl(meth) acrylate/(C1-18) alkyl(meth)acrylate copolymers, ethylene/(C1-18) alkyl(meth)acrylate copolymers, polyisobutylene, polyalkylstyrenes, ethylene/propylene copolymers, styrene/maleate copolymers, styrene/isoprene hydrogenated copolymers, and the like. A dispersible or multifunctional viscosity index improver to which dispersing properties are imparted may also be used. The average molecular weight thereof is about 10,000 to 1,500,000. The amount of these viscosity index improvers formulated is preferably 0.1 to 20 wt %, more preferably 0.3 to 15 wt % with respect to the base oil. A methacrylate-based polymer is preferably used as the viscosity index improver because it has remarkably significant properties as a viscosity index modifier. Although the extreme pressure agent of the present invention has a structure similar to that of a specific viscosity index improver, it barely has any function as a viscosity index improver because it is an acrylate-based polymer.

Examples of the pour-point depressants include polyalkyl methacrylates, polyalkyl acrylates, polyalkylstyrenes, polyvinyl acetates, and the like. The weight average molecular weight thereof is 1,000 to 100,000. The amount of these pour-point depressants formulated is preferably 0.005 to 3 wt %, more preferably 0.01 to 2 wt % with respect to the base oil. In the same manner as the viscosity index improver, the pour-point depressant is preferably a methyacrylate-based polymer, and the extreme pressure agent of the present invention barely has any function as a pour-point depressant.

Examples of the antirust agents include sodium nitrite, oxidized paraffin wax calcium salts, oxidized paraffin wax magnesium salts, tallowate alkali metal salts, alkali earth metal salts or amine salts, alkenyl succinic acid or alkenyl succinic half esters (the molecular weight of alkenyl group is about 100 to 300), sorbitan monoester, nonylphenolethoxyalte, lanolin fatty acid calcium salts, and the like. The amount of these antirust agents formulated is preferably 0.01 to 3 wt %, more preferably 0.02 to 2 wt % with respect to the base oil.

Examples of the anticorrosive agents include benzotriazole, benzoimidazole, benzothiazole, benzothiadiazole, tetraalkyl thiuram disulfide, and the like. The amount of these anticorrosive agents is preferably 0.01 to 3 wt %, more preferably 0.02 to 2 wt % with respect to the base oil.

Examples of antifoaming agents include polydimethyl silicone, trifluoropropyl methyl silicone, colloidal silica, polyalkyl acrylates, polyalkyl methacrylates, alcohol ethoxy/propoxylates, fatty acid ethoxy/propoxylates, sorbitan partial fatty acid esters, and the like. The amount of these antifoaming agents formulated is preferably 0.001 to 0.1 wt %, more preferably 0.001 to 0.01 wt %.

The lubricant oil composition of the present invention may be used for any lubrication purposes. For example, it may be used in lubricant oils such as engine oil, gear oil, turbine oil, working oil, flame retardant operating liquid, refrigerant oil, compressor oil, vacuum pump oil, shaft bearing oil, insulating oil, sliding surface oil, rock drill oil, metalworking fluid, plastic working oil, heat treating oil, grease oil, and the like. Among them, it is preferably used in engine oil, gear oil, shaft bearing oil, metalworking fluid, and grease.

EXAMPLES

The present invention will be specifically explained with reference to examples.

<Synthesis of Sample 1>

240 g (1 mole) of dodecyl acrylate ($R^1$ in the general formula (1) is a dodecyl group) as the monomer (a) and 116 g of 2-hydroxyethyl acrylate ($R^2$ in the general formula (2) is an ethylene group) as the monomer (b), and 178 g of methanol and 178 g of dioxane as solvents were charged into a four-necked flask equipped with a thermometer, a nitrogen inlet, and a stirrer and having a volume of 1000 ml. The flask was filled with nitrogen, 3.3 g of 2,2'-azobis(2-methylpropionitrile) as an initiator was added, and then the temperature was slowly raised with stirring. The mixture was reacted for five hours at a temperature of 85 to 95° C. under reflux to obtain Sample 1. The monomer ratio of Sample 1 was monomer (a)/monomer (b)=50/50 (molar ratio). As a result of determination of molecular weight by GPC, the weight average molecular weight in terms of styrene was 98,000.

<Synthesis of Other Samples>

Using the a-1 to a-7 and b-1 to b-5 monomers below, polymers of Samples 2 to 18 were synthesized in the same manner as in Sample 1. 178 g of isopropanol was used as a solvent in place of methanol for Sample 16. The amount of the initiator was changed to 1.1 g (⅓ the amount of the polymerization method for Sample 1) and the polymerization reaction was conducted, while the molecular weight was controlled.

a-1: Decyl acrylate ($R^1$=decyl group in the general formula (1))
a-2: Dodecyl acrylate ($R^1$=dodecyl group in the general formula (1))
a-3: Octadecyl acrylate ($R^1$=octadecyl group in the general formula (1))
a-4: Butyl acrylate ($R^1$=butyl group in the general formula (1))
a-5: 2-Ethylhexyl acrylate ($R^1$=2-ethylhexyl group in the general formula (1))
a-6: Dodecyl methacrylate
a-7: Hexadecyl methacrylate
b-1: 2-Hydroxyethyl acrylate ($R^2$=ethylene group in the general formula (2))
b-2: 2-Hydroxypropyl acrylate ($R^2$=propylene group in the general formula (2))
b-3: 2-Hydroxyethyl methacrylate
b-4: N,N-dimethyl aminoethyl acrylate

TABLE 1

Products of the present invention

| | Kind of monomers | | Molar ratio of monomers | | Molecular |
|---|---|---|---|---|---|
| | (a) | (b) | (a) | (b) | weight |
| Sample 1 | a-2 | b-1 | 50 | 50 | 98000 |
| Sample 2 | a-2 | b-1 | 60 | 40 | 82000 |
| Sample 3 | a-2 | b-1 | 70 | 30 | 63000 |
| Sample 4 | a-2 | b-1 | 80 | 20 | 55000 |
| Sample 5 | a-1 | b-1 | 60 | 40 | 45000 |
| Sample 6 | a-3 | b-1 | 50 | 50 | 142000 |
| Sample 7 | a-2 | b-2 | 60 | 40 | 98000 |

TABLE 2

Comparative products

| | Kind of monomers | | Molar ratio of monomers | | Molecular |
|---|---|---|---|---|---|
| | (a) | (b) | (a) | (b) | weight |
| Sample 8 | a-2 | b-3 | 60 | 40 | 85000 |
| Sample 9 | a-2 | b-4 | 60 | 40 | 78000 |
| Sample 10 | a-4 | b-1 | 60 | 40 | 64000 |
| Sample 11 | a-5 | b-1 | 60 | 40 | 83000 |
| Sample 12 | a-6 | b-1 | 70 | 30 | 72000 |
| Sample 13 | a-7 | b-1 | 70 | 30 | 89000 |
| Sample 14 | a-2 | b-1 | 40 | 60 | 102000 |
| Sample 15 | a-2 | b-1 | 90 | 10 | 42000 |
| Sample 16 | a-2 | b-1 | 60 | 40 | 37000 |
| Sample 17 | a-2 | b-1 | 60 | 40 | 154000 |

Other Comparative Products
Sample 18: Tricresyl phosphate
Sample 19: Chlorinated paraffin (chlorine content of 40 wt %)
Sample 20: Glycerin monooleyl ester Test Method Samples 1 to 20 above were dissolved by heating in the base oils 1 and 2 below such that each accounted for 1 wt %, let stand at 25° C. for 24 hours, and then it was determined whether any precipitates were formed therein. Those in which no precipitates were confirmed were used as test samples and were subjected to a test on extreme pressure performance using a Shell type high speed four-ball tester. Samples 1 to 17 were produced in a form dissolved in a solvent, but those from which the solvent was removed by vacuum distillation were used as samples to be added (the added amount in terms of solid content). Specifically, the method comprised performing a test on load bearing properties by variously changing the load applied to the balls at room temperature, for 10 seconds, at 1760 rpm to determine the wear track diameter (mm) of the balls to which the load of each of various values was applied. The smaller the wear track diameter was, the higher the extreme pressure performance the lubricant oil had. The test on solution stability was performed, based on the following evaluation standard. When the wear track diameter exceeded 1.0 mm, the test on extreme pressure performance under higher load was not conducted. Results of the tests using the base oil 1 are shown in Table 3 and results of the base oil 2 are shown in Table 4.

Base oil 1: Kinetic viscosity 4.24 $mm^2/S$ (100° C.), 19.65 $mm^2/S$ (40° C.), mineral oil having a viscosity index of 126
Base oil 2: Kinetic viscosity 4.0 $mm^2/S$ (100° C.), 18.4 $mm^2/S$ (40° C.), synthetic oil having a viscosity index of 119

Test on Solution Stability
◯: homogenous solution in which no precipitates were observed
X: precipitates were observed

TABLE 3

Results of tests using the base oil 1

| | | | Worn diameter (mm) of ball to which load of each value had been applied | | | | | | Test on solution stability |
|---|---|---|---|---|---|---|---|---|---|
| | | Sample | 40 kg | 60 kg | 80 kg | 100 kg | 120 kg | 140 kg | |
| Example | 1 | Sample 1 | 0.28 | 0.32 | 0.34 | 1.67 | | | ◯ |
| | 2 | Sample 2 | 0.25 | 0.29 | 0.33 | 0.37 | 0.39 | 2.01 | ◯ |
| | 3 | Sample 3 | 0.29 | 0.32 | 0.35 | 0.38 | 1.87 | | ◯ |
| | 4 | Sample 4 | 0.30 | 0.34 | 0.38 | 1.95 | | | ◯ |
| | 5 | Sample 5 | 0.28 | 0.33 | 0.36 | 0.39 | 1.95 | | ◯ |
| | 6 | Sample 6 | 0.29 | 0.33 | 0.35 | 1.98 | | | ◯ |
| | 7 | Sample 7 | 0.28 | 0.33 | 0.36 | 0.38 | 1.35 | | ◯ |

TABLE 3-continued

Results of tests using the base oil 1

| | | Sample | \multicolumn{6}{c|}{Worn diameter (mm) of ball to which load of each value had been applied} | Test on solution stability |
|---|---|---|---|---|---|---|---|---|---|
| | | | 40 kg | 60 kg | 80 kg | 100 kg | 120 kg | 140 kg | |
| Comparative Example | 1 | Sample 8 | | | | | | | X |
| | 2 | Sample 9 | 0.28 | 0.32 | 1.25 | | | | ○ |
| | 3 | Sample 10 | | | | | | | X |
| | 4 | Sample 11 | | | | | | | X |
| | 5 | Sample 12 | 0.29 | 0.31 | 1.15 | | | | ○ |
| | 6 | Sample 13 | 0.28 | 0.33 | 1.35 | | | | ○ |
| | 7 | Sample 14 | | | | | | | X |
| | 8 | Sample 15 | 0.29 | 0.30 | 1.51 | | | | ○ |
| | 9 | Sample 16 | 0.29 | 0.30 | 1.20 | | | | ○ |
| | 10 | Sample 17 | | | | | | | X |
| | 11 | Sample 18 | 0.30 | 0.33 | 0.35 | 1.23 | | | ○ |
| | 12 | Sample 19 | 0.45 | 0.56 | 0.85 | 1.45 | | | ○ |
| | 13 | Sample 20 | 0.33 | 1.81 | | | | | ○ |
| | 14 | — | 0.62 | 2.08 | | | | | — |

* Regarding Comparative example 14, test results using only the base oil are shown.

TABLE 4

Results of test using the base oil 2

| | | Sample | \multicolumn{6}{c|}{Worn diameter (mm) of balls to which load of each value had been applied} | Test on solution stability |
|---|---|---|---|---|---|---|---|---|---|
| | | | 40 kg | 60 kg | 80 kg | 100 kg | 120 kg | 140 kg | |
| Example | 8 | Sample 3 | 0.29 | 0.32 | 0.35 | 0.39 | 2.03 | | ○ |
| Comparative Example | 15 | Sample 9 | 0.29 | 0.33 | 1.32 | | | | ○ |
| | 16 | Sample 18 | 0.28 | 0.33 | 0.35 | 1.29 | | | ○ |
| | 17 | — | 0.33 | 1.45 | | | | | — |

* Regarding Comparative example 17, test results using only the base oil are shown.

The results above show that the extreme pressure agent of the present invention exhibited performance equivalent to or higher than those of conventional extreme pressure agents containing phosphorus atoms and chlorine atoms (Comparative examples 11, 12). In addition, the methacrylic acid-based polymer having a structure similar to that of the extreme pressure agent of the present invention exhibited poor performance, compared with the conventional extreme pressure agents. This indicates that the level of performance thereof is significantly different, compared with the corresponding extreme pressure agent of the present invention (acrylic acid-based polymer).

The invention claimed is:
1. An extreme pressure agent for lubricant oils comprising a copolymer (A) consisting of an alkyl acrylate (a) represented by formula (1) below and a hydroxyalkyl acrylate (b) represented by formula (2) below as essential constituent monomers, wherein a reaction ratio of (a) to (b) is 50/50 to 80/20 (molar ratio) and a weight average molecular weight of the copolymer (A) is 40,000 to 150,000

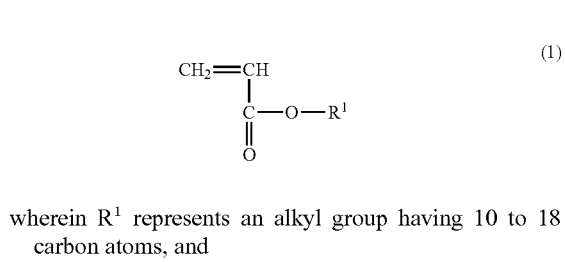

wherein $R^1$ represents an alkyl group having 10 to 18 carbon atoms, and

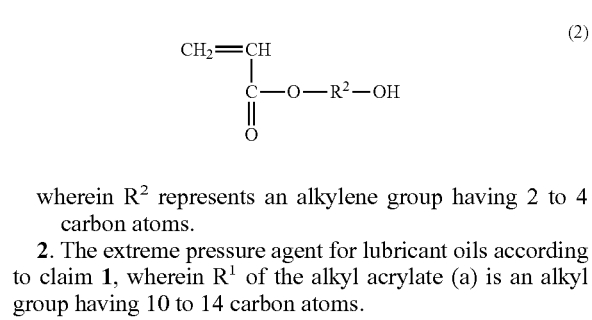

wherein $R^2$ represents an alkylene group having 2 to 4 carbon atoms.

2. The extreme pressure agent for lubricant oils according to claim 1, wherein $R^1$ of the alkyl acrylate (a) is an alkyl group having 10 to 14 carbon atoms.

3. A lubricant oil composition comprising a base oil and the extreme pressure agent for lubricant oils according to claim 1, wherein the extreme pressure agent for lubricant oils is contained in an amount of 0.1 to 50 wt % with respect to the total amount of the lubricant oil composition.

4. A lubricant oil composition comprising a base oil and the extreme pressure agent for lubricant oils according to claim 2, wherein the extreme pressure agent for lubricant oils is contained in an amount of 0.1 to 50 wt % with respect to the total amount of the lubricant oil composition.

* * * * *